Patented Feb. 6, 1934

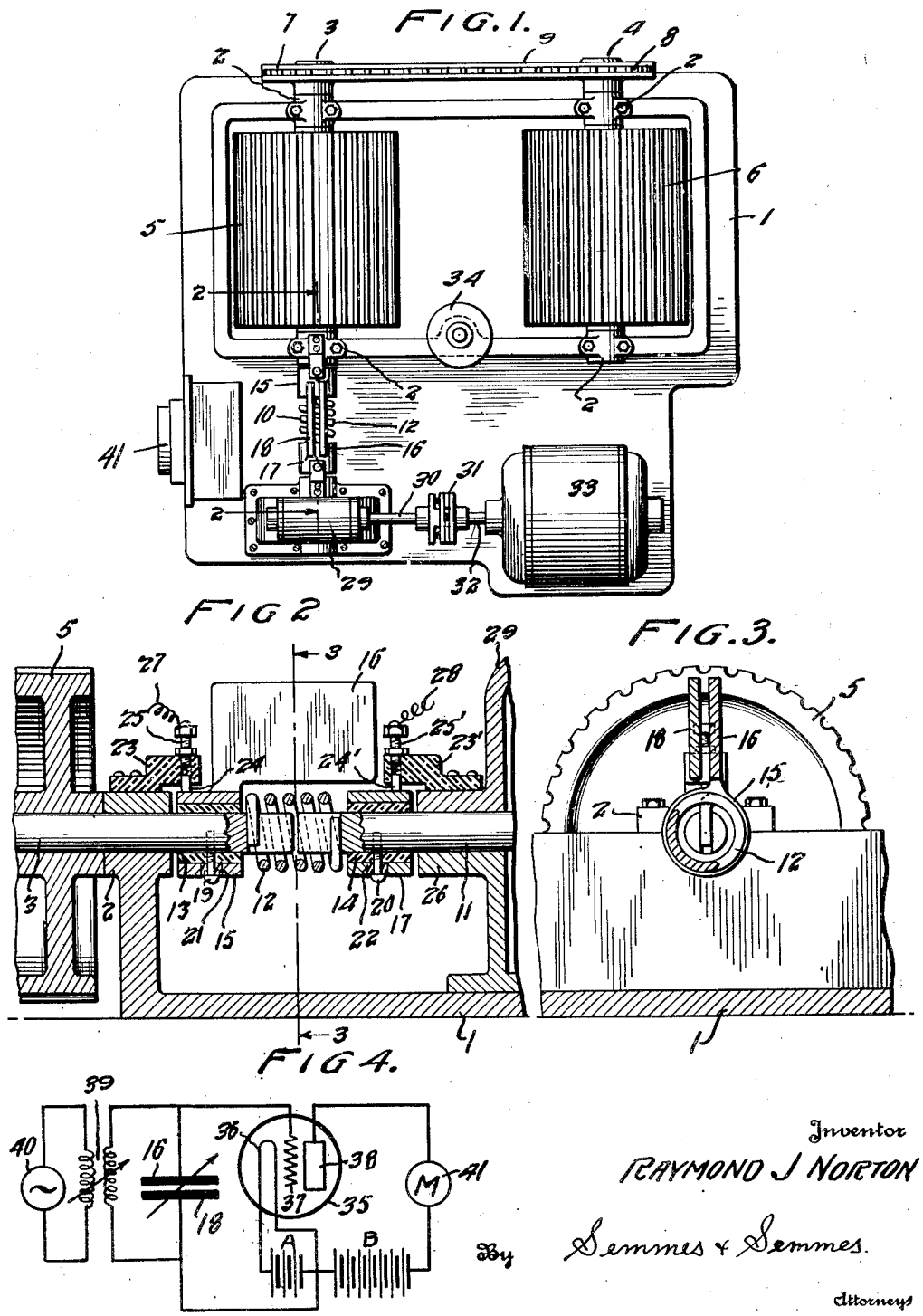

1,946,099

UNITED STATES PATENT OFFICE 1,946,099

ELECTRICAL DYNAMOMETER

Raymond J. Norton, Washington, D. C., assignor, by mesne assignments, to Bendix-Cowdrey Brake Tester, Inc., New York, N. Y., a corporation of Delaware Application March 5, 1929. Serial No. 344,573

1 Claim. (Cl. 265—25)

This invention relates in general to brake testing apparatus and more particularly has reference to an apparatus for electrically determining the efficiency of brake mechanisms.

This device generally includes a transmission dynamometer interposed between the source of power and the braking mechanism which serves to measure the reaction force or the torque imposed on the testing assemblage by the application of the brake of a given wheel.

The purpose of the present invention is to increase the efficiency of testing structures by minimizing the frictional losses, and to effect installing and operating economy by simplifying the physical structure, and consequently increasing the sensitivity of the structure as a whole. To accomplish this result it has been found necessary to depart entirely from the heretofore methods of testing, which utilized a mechanical apparatus for receiving, transmitting and recording the braking torque created by the application of the brakes on the vehicle being tested. Because of the above pointed out and other inherent disadvantages in testers of the mechanical type, there is a pressing need for an accurate, sensitive, simple and reliable means for measuring brake resistance. The present invention, therefore, resides in the means of testing the brakes on automotive vehicles, which will eliminate the use of the hereinbefore described complicated mechanical devices. This invention is carried into effect by providing for electrically measuring the efficiency of vehicle brakes.

An object of this invention, therefore, is to provide a simple but accurate and sensitive means for determining the retarding force exerted by the braking mechanism of automotive vehicles.

Another object of this invention is to provide an apparatus to measure the resistance of an automotive vehicle brake by measuring a quantity, the value of which is affected by a mechanical effect produced by the application of a brake.

Yet another object of this invention is to provide apparatus for testing brakes of automotive vehicles in which the mechanical effect produced by applying the brake mechanism is transmitted to a device for effecting electrical energy in a circuit associated with the testing apparatus.

A still further object of this invention is to provide an apparatus for testing brakes of automotive vehicles, in which the mechanical effect produced by the application of brakes is transmitted to a variable condenser, which is used to vary the frequency of an electric current flowing through a circuit, and in which variations in frequencies are indicated as retardation effects.

With these and other objects in view, which may be incident to my improvements, the invention consists in the concept of utilizing a mechanical effect of brake application to control electrical energy such as the quantity of electrical current flowing from a source through a circuit, or the frequency of an electric current, and then measuring the effect of the control as hereinafter set forth and claimed, with the understanding that the several necessary features of my invention may be varied without departing from the spirit and scope of the appended claim.

In order to make my invention more clearly understood, I have shown in the accompanying drawing means for carrying the same into practical effect, without limiting the improvements in their useful applications to the particular constructions, which for the purpose of explanation, have been the subject of illustration.

In the drawing:

Figure 1 is a plan view of a brake testing machine constructed in accordance with my invention.

Figure 2 is a detailed sectional view taken on line 2—2 of Figure 1, showing the mechanism for varying the capacity of a condenser.

Figure 3 is a sectional view taken on line 3—3 of Figure 2.

Figure 4 is a diagrammatic illustration of an electrical circuit associated with the testing machine.

Brake mechanisms are provided on automotive vehicles primarily to decelerate the speed of the vehicle. In the present practice, brake mechanisms are provided directly on the ground wheels of the vehicle, or on shafts directly connected with all or certain of the ground wheels. The immediate and direct result of the operation of the braking mechanism is a decrease in the angular velocity of the brake-controlled ground wheels. Upon applying a light force to the brake-operating device, the deceleration will be relatively and correspondingly small; however, upon increasing the force applied to the brake-operating device, the deceleration effect of the brake mechanism will be proportionately increased. The preceding is, of course, based on the assumption that possible variables, such as the coefficient of friction between the drum and the braking element, the brake mechanism, etc., be maintained substantially constant.

The present specific embodiment of the invention comprises measuring a quantity which is a derivative of the increase in torque in a transmission shaft driving a given wheel, which itself results from the application of a given retarding force to the wheel. In particular, the present embodiment comprises the measurement of a factor which is a derivative of the speed retardation, and consequently the variation in torque, by controlling the measurable characteristics of an electric current, and indicating the degree of control.

In order to simplify the description of my invention, a device susceptable of carrying the same into effect has been illustrated rather diagrammatically in the accompanying drawing. It will be appreciated, in view of the principles herein involved, that numerous diversifications and modifications in the actual structure will readily suggest themselves to those skilled in the art. As shown in the drawing, the invention may be embodied in a unit comprising a base 1, which may be mounted in any desired position at the end of a ramp, or suitably installed in a pit, or in any other location found advantageous for the purpose of testing brakes. The base 1 is provided with a plurality of bearings 2, which journal shafts 3 and 4, which in turn support corrugated rollers 5 and 6 respectively. The rollers 5 and 6 are surfaced and are so positioned that they may be effectively used for driving a wheel of an automotive vehicle.

One end of the shaft 3 carries a sprocket wheel 7, and the corresponding end of shaft 4 carries a similar sprocket wheel 8. Passing over the sprocket wheels 7 and 8 is a suitable chain 9, which is so positioned and adjusted as to transmit rotary motion from one of the rollers to the other. The other end of shaft 3 projects beyond the bearing 2 and is connected with a device 10, portions of which vary with a variation in torque imposed thereon.

Associated with the torsion device 10 is a driven shaft 11 of a speed reduction device 29, which may be of any desired type or speed ratio. The driving shaft 30 of the speed reduction device 29 is connected by a flexible coupling 31 to the shaft 32 of an electric motor 33. The speed reduction device 29 and the motor 33 are preferably mounted on the base 1, together with the other elements of the brake tester.

It will be understood from the foregoing description that upon energizing the motor 33 the shaft 32 will be rotated, and rotary motion will be transmitted through the coupling, speed reduction device 29, torsion device 10 and shaft 3, to roller 5, and by means of the chain drive 7, 9, 8 to roller 6. The drive between rollers 5 and 6 is such that the two rollers rotate in the same direction. Thus, when a vehicle wheel is placed on the rollers, it will be rotated by the action of both rollers. To prevent the wheel running off of rollers 5 and 6 onto the driving machinery, a vertically mounted roller 34 is positioned on a shaft carried by base 1.

From the discussion hereinbefore set forth, it will be understood that the present embodiment contemplates utilizing the variation in the torque imposed on device 10 under varying load conditions imposed on the testing machine by the application of brake mechanism to retard rotation of the wheel to vary the characteristic of electrical energy in an electrical circuit. This may be practically effected by means of the structure shown in the drawing.

As is clearly shown in Figure 2, shaft 3 is resiliently connected to shaft 11 by means of a coil spring 12. One end of the spring 12 is fixed to shaft 3, and the other end is secured to shaft 11 in such a manner that rotary motion of shaft 11 will be translated to shaft 3. If a load is imposed on shaft 3, it will be displaced angularly with respect to shaft 11. As the load on shaft 3 is increased, the relative angular displacement will be increased.

This invention employs the angular displacement of shaft 3 relative to shaft 11 for operating a device for affecting the characteristic of electrical energy. One specific embodiment of electrical energy affecting device is clearly shown in the drawing. An insulating bushing 13 is mounted on shaft 3, and a similar bushing 14 is mounted on shaft 11. Positioned on bushing 13 is a metallic sleeve 15, which is formed of any suitable current conducting material. Attached to, or formed integrally with sleeve 15 is a plate 16, which serves as a plate of a variable air condenser. A similar sleeve 17 carrying a plate 18 is positioned on bushing 14.

Sleeves 15 and 17 are fixed to shafts 3 and 11 by means of screws 19 and 20, respectively, which are insulated from the sleeves by suitable insulating bushings 21 and 22. The plate carrying sleeves are of sufficient width to serve as current conducting rings. As shown in Figure 2, a brush holder 23 is so positioned on bearing 2 as to support a brush 24 in contact with sleeve 15. Brush holder 23 is provided with a socket, in which the brush 24 is slidably mounted. A portion of the socket is threaded to receive a screw for adjusting the pressure of a spring on brush 24, which varies the pressure between brush 24 and sleeve or ring 15. A similar structure is associated with the bearing 26 of the speed reduction device 29; similar parts being indicated by similar reference characters, primed. Suitable leads 27 and 28 are associated with the brushes 24 and 24', by means of which the device is connected with an electrical circuit. While I have described a particular type of brush construction, I wish it to be clear that any other type found suitable may be utilized.

It will be appreciated that any variation in the relative angular displacement of shafts 3 and 11 will cause a corresponding variation in the relative angular position of plates 16 and 18, and consequently a variation in the capacity of the condenser formed by plates 16 and 18. In the construction shown in the drawing the capacity of the condenser is increased with imposition of an increased load on the rollers 5 and 6, but I wish it to be clearly understood that the plates 16 and 18 may be arranged on the torsion device so that an increase in load will effect a decrease in the capacity of the condenser. The condenser formed by plates 16 and 18 may be placed in an electrical circuit such as is diagrammatically shown in Figure 4. This circuit includes an electron tube 35, having a filament 36, grid 37 and plate 38.

One coil of a manually operated variable inductance 39 is connected in the grid circuit; that is, between the grid 37 and one side of the filament. The variable condenser formed by plates 16 and 18 is also placed in the grid circuit and is shunted across the coil 39. The other coil of the inductance 39 is connected to a source of electrical energy 40, which may be an alternator or oscillator of any suitable design. A meter, either of the ammeter or frequency meter type 41 is connected in series with a "B" battery in the plate circuit to measure the flow of current therethrough.

When the alternator is placed in operation, oscillation will be set up in its circuit and in the grid circuit of the electron tube. Upon supplying current to the filament 36 from the "A" battery, there will be a flow of electrons from the filament to the plate, causing a current to flow in the plate circuit. Now, if the grid circuit is tuned by varying the capacity of condenser 16, 18, the E. M. F. across the inductance and condenser will be varied. This will produce a variation in the current flowing in the plate circuit. When the grid circuit is in resonance, the potential will be a maximum, and the plate current will be at a maximum, other conditions remaining unchanged. As the reactance of the grid circuit is varied, the current in the plate circuit will be varied. Thus, for a variation in the capacity of condenser 16, 18 there will be a direct variation in the current flowing through the plate circuit.

Since the current flowing through the plate circuit is a function of the reactance of the grid circuit, and the latter is a function of the variation in capacity of condenser 16, 18, and the capacity of this condenser varies directly as the torque tending to angularly displace shaft 11 relative to shaft 3, the current indicated on the dial of the current indicating instrument 41 may be used to compute the torque and the brake resistance in terms of other physical quantities.

In the preferred form of the invention the meter employed is somewhat modified; that is, the dial is calibrated so that the pointer directly indicates brake resistance in terms of retarding torque.

These calibrations may be made, as will be understood, by testing the speed of the testing unit when operating against given varying torques imposed and indicated by a suitable Prony brake, or other dynamometer. Since the increase in current indicated by the meter 41 is proportionate to the increased resistance exerted by the brake being tested, the transformation and calibration may readily be made. The actual calibration of a given unit will, of course, depend on the particular hook-up employed, the resiliency of spring 12, the size of condenser 16, 18, the type and size of thermionic tube employed, the value and character of energy generated by the alternator 40, the potential of the "A" and "B" batteries and on the value of inductance in the circuit. The manually operable inductance 39 provides a means for adjusting the reading of the meter 41 to initial conditions.

This invention is susceptible of modification to substitute variable condensers to types other than shown, for instance, of the multiple plate type, in place of the condenser 16, 18 on the torsion device 10.

The condenser 16, 18 may be associated with an alternating current circuit for varying the frequency thereof. In this instance a frequency meter is employed to indicate variations in frequency. Since the variation in frequency depends on the variation in capacity of the condenser, which in turn depends upon the retardation effect of the application of brakes to the element being tested, the frequency meter can be calibrated as in the case of the current indicating device to read directly in terms of brake retardation. If found desirable, a condenser of the straight line frequency type may be employed in which instance equal variation in the displacement of the elements of the condenser effect equal variations in frequencies.

The mode of operation of the tester will have been appreciated from the foregoing description. When the vehicle is in testing position, so that a wheel engages the wheel rotating rollers 5 and 6, the closing of the motor circuit will cause motor 33 to effect rotation of these rollers through the interposed transmission. Upon applying the brakes to the wheel, the driving motor will rotate the wheel against the resistance of the brake but with an increase in the torque in the transmission corresponding to the brake resistance. This increase in torque will cause a fluctuation in the torsion device located in the transmission.

This fluctuation in the torsion device will effect a variation in the capacity of the condenser associated therewith. The variation in the capacity of condenser 16, 18 will, as hereinbefore described, affect the energy in the grid circuit of the electron tube to cause a variation in the current in the plate circuit, which is determined by means of a current indicating device. The brake retardation will be indicated directly on the indicating device up to a point where the vehicle wheel slips with respect to the wheel rotating means.

When employed for varying the frequency of a circuit, the brake retardation will indicate directly on the dial of a frequency meter up to a point where the vehicle wheel slips relative to the driving means.

The electrical circuit and instruments have been shown associated with the base 1 of the testing apparatus, but I wish it to be clearly understood that the electrical devices particularly those affected by vibrations, may be placed in any suitable location remote to the testing apparatus.

I wish it to be clearly understood that in the event indications on the dial of the final indicating meter are not large enough, the final indicating energy can be amplified by any type of amplification system so as to obtain sufficient energy for effecting as large an indication on the dial of the instrument as is desirable.

It will be appreciated that I have provided a very simple and effective apparatus of testing vehicle brakes. The apparatus involves a very simple electrical circuit, necessitating the use of electrical equipment which is standard and readily available on the market. Also employment of the several simple electrical elements involved in the testing mechanism obviates the necessity of the use of a complicated mechanical dynamometer. All of the electrical elements involved in the testing device are of a type which may be very readily checked from time to time to determine the accuracy of the testing device.

While I have shown and described a particular embodiment of the invention, it is to be understood that this is given purely by way of example. As hereinbefore pointed out, the fundamental concept involved in this invention is a utilization of a variable electrical condenser for the transformation of a mechanical effect into an electrical effect, which may be used as a means of measuring the efficiency of the brake being tested. I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claim.

I claim:

A dynamometer for a brake tester having a driving shaft and a driven shaft comprising a resilient coupling for said shafts adapted to allow relative rotation thereof in response to torque, an element of a variable electrical condenser mounted on the driving shaft, another element of the condenser mounted on the driven shaft and means for measuring the variation in capacity of the condenser.

RAYMOND J. NORTON.